June 21, 1966     J. J. SMITH     3,256,735
METER BY-PASSING ARRANGEMENT
Original Filed Aug. 31, 1961     2 Sheets-Sheet 1

INVENTOR
John J. Smith

BY Cushman, Darby & Cushman
ATTORNEYS

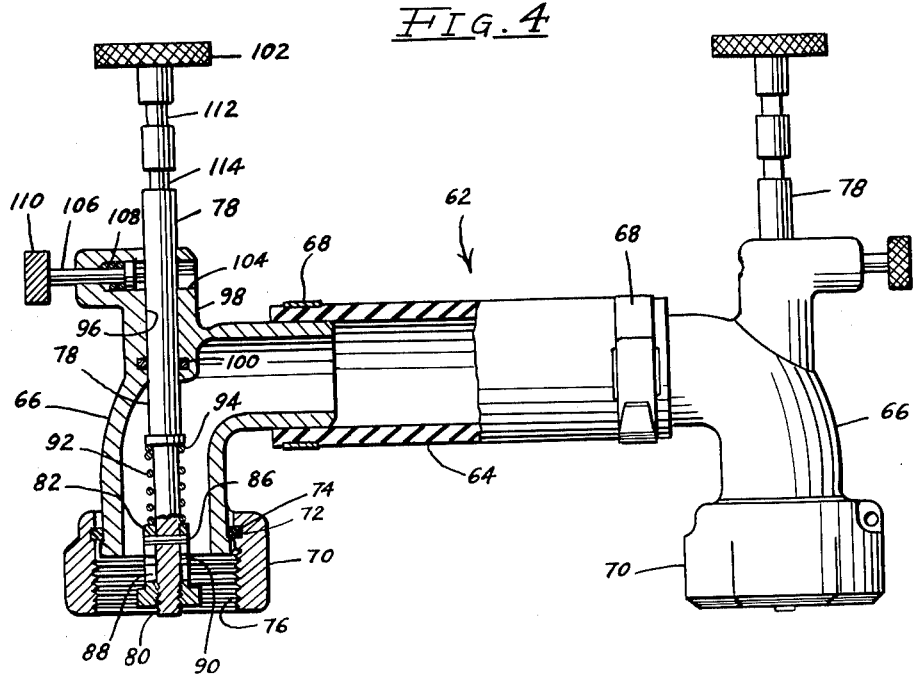
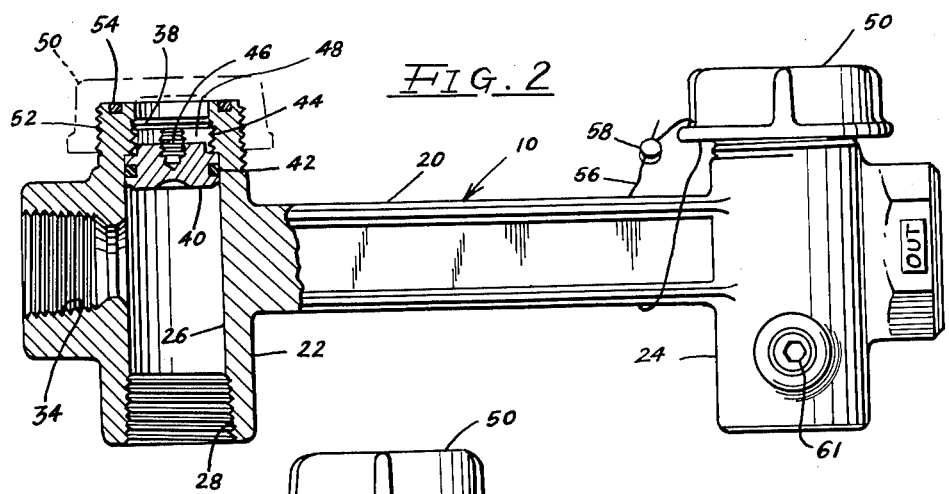
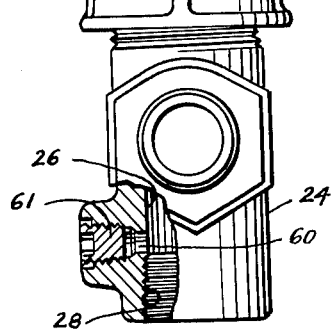

United States Patent Office  3,256,735
Patented June 21, 1966

3,256,735
METER BY-PASSING ARRANGEMENT
John J. Smith, Decatur, Ill., assignor to Mueller Co., Decatur, Ill., a corporation of Illinois
Continuation of application Ser. No. 135,191, Aug. 31, 1961. This application May 11, 1964, Ser. No. 366,318
18 Claims. (Cl. 73—201)

This application is a continuation of my prior application Serial No. 135,191, filed August 31, 1961, and now abandoned.

This invention relates to an arrangement for bypassing a fluid meter, such as a meter in a domestic gas line. More especially, this invention relates to improvements in the meter by-pass arrangement disclosed in the patent to Magleby, No. 3,173,295.

Fluid meters, particularly domestic gas meters, are removed occasionally for repair or calibration, and usually are immediately replaced with either a new or a properly reconditioned meter. In order to avoid interruption of service, meter installations are known wherein the gas can be made to by-pass the meter while the latter is being removed and replaced. Known by-passing meter installations have for the most part, however, been relatively costly, involving, for example complicated valves and locks therefor.

The by-pass arrangement disclosed in the aforementioned Magleby application minimizes the expense, however, by providing a meter installation that is equipped only with simple valves and providing a separate by-passing assembly adapted to be connected to the installation when the meter is to be by-passed. Such a separate by-passing assembly obviously can be used in connection with many meter installations.

This invention seeks to even further reduce the expense of a by-pass arrangement of the Magleby type, while at the same time providing for a more positive control over the permanently installed valves. The invention also makes provision for preventing inadvertent extinction of pilot lights because of the failure to completely purge a newly installed meter of air.

Other objects and advantages of the invention will become apparent from the following description and accompanying drawings in which:

FIGURE 2 is an enlarged side elevational view, partly in vertical section, illustrating the meter bar used in the installation shown in FIGURE 1;

FIGURE 3 is an elevational view of the right-hand end of the bar shown in FIGURE 2, with a portion being shown in vertical section in order to illustrate details;

FIGURE 4 is an enlarged side elevational view, partly in vertical section, showing the by-passing assembly shown in FIGURE 1;

Figure 1:
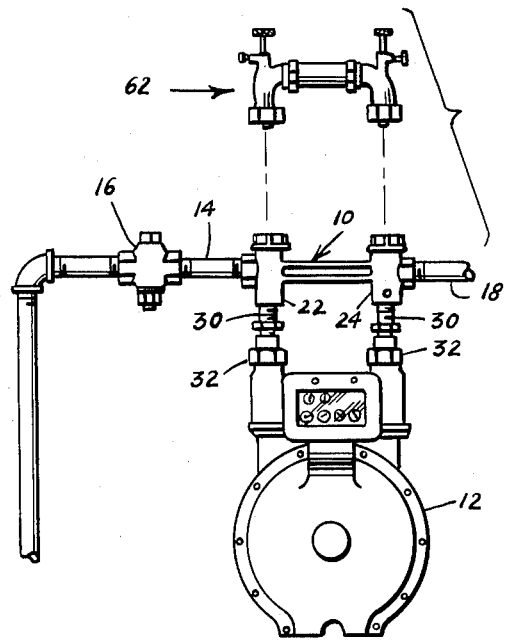
FIGURE 1 is a fragmentary elevational view showing a meter installation embodying this invention, and also showing a by-pass assembly embodying this invention adapted to be coupled to the installation for meter by-passing purposes.

Referring now to FIGURE 1 of the drawings, there is shown a gas meter installation bar 10 which includes a meter supporting a domestic gas meter 12 connected between a service line 14, having a conventional meter stop therein 16, and dwelling piping 18. The meter bar 10 has an elongated bar-like portion 20 having inlet and outlet T's structures 22 and 24 formed integrally at its opposite ends. The inlet and outlet T structures 22 and 24 are substantially identical, having preferably parallel through bores 26 extending at right angles to the longitudinal axis of the bar-like portion 20. Each bore 26, at its lower end, is provided with interior threads 28 to permit such end to be connected with the meter 12, such connection usually being effected by a nipple 30 engaged with the bore threads 28 and connected with the meter by an appropriate pipe coupling 32, as shown in FIGURE 1. Immediate the ends of its through bore 26, each T 22 and 24 is provided with an interiorly threaded opening 34. In the inlet T 22 the opening 34 forms a lateral inlet into which is screwed the end of the service line 14. In the outlet T 24, the opening 34 forms a lateral outlet into which is screwed the inlet end of the house piping 18.

Figure 5:
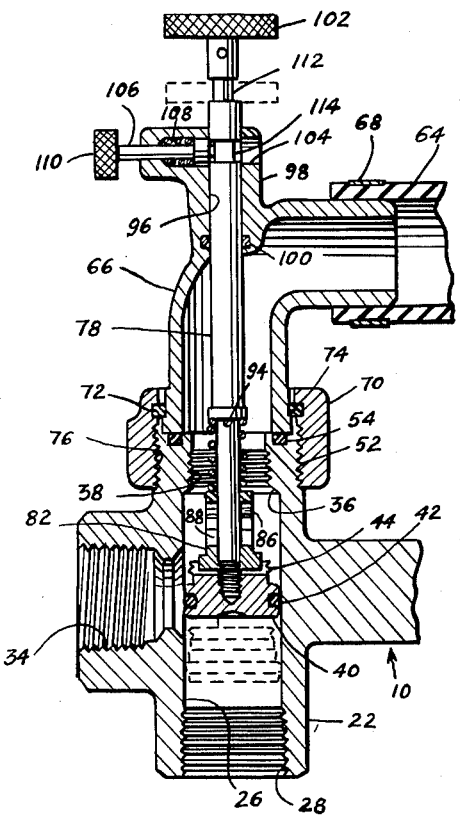
FIGURE 5 is an enlarged fragmentary vertical sectional view illustrating the manner in which the by-passing assembly is connected to the meter installation.

The upper end of the through bore 26 of each T is reduced in diameter to provide a downwardly facing shoulder 36, best shown in FIGURE 5, and the reduced bore section thereabove is provided with interior threads 38. Slidably movable in the through bore 26 of each T, below the shoulder 36, is a short cylindrical valve plug 40 provided with a circumferential groove within which is disposed an annular gasket 42, preferably in the form of an O-ring, of rubber or the like. The radial section diameter of the O-ring 42, when relaxed, is such that it will be compressed slightly between the bottom of the groove and the wall of the bore 26 so as to provide an effective seal between the valve plug 40 and such wall. At its upper end the valve plug 40 has a reduced exteriorly threaded extension 44 adapted to be engaged with the threads 38 in the reduced bore section, as shown in FIGURE 2. The upper end of the extenion 44 is provided with an interiorly threaded coaxial socket 46 and a noncircular configuration, e.g., a transverse kerf 48, for engagement by a complementary noncircular configuration on the end of a turning tool, as later described.

From the foregoing construction it will be apparent that when a valve plug 40 is engaged with the threads 38 in the upper end of a T, as shown in FIGURE 2, the plug will block flow between the upper end of the through bore 26 and the lateral opening 34, while permitting flow between the latter and the lower end of the bore. Such position of the valve plug 40 may be termed a meter position. It also will be seen that when the valve plug 40 is moved, as later described, to a position below the lateral opening 34, as shown in dotted lines in FIGURE 5, the plug will block flow from the lateral opening to the lower end of the bore 26, while permitting flow between the lateral opening and the upper end of the bore. For convenience, this position of the valve plug 40 will be termed a by-pass position. It further will be seen that the valve plug 40 can be positioned opposite the lateral opening 34 so as to permit flow between the latter and both ends of the T through bore 26, as shown in FIGURE 5. For convenience, this position of the valve plug 40 will be termed an intermediate valve position.

The upper end of each T 22 and 24 preferably is covered by a cap 50 threaded onto exterior threads 52. Preferably, a seal is effected between the cap 50 and the T, as by means of an O-ring 54 disposed in an annular groove in the upper end of the T, and engaging with both the bottom of the groove and the inner surface of the cap, as shown in FIGURE 2. Desirably, each cap 50 has an aperture in its rim for the reception of a sealing wire 56 which may be looped about the bar portion 20 and have its ends fastened together, as by a lead seal 58, to preclude unnoticed removal of the cap by a householder, also as shown in FIGURE 2.

The outlet T 24, which is otherwise identical with the inlet T 22, has a lateral restricted purging port 60 which provides communication between the atmosphere and the T through bore 26 above the interior threads 28 at the lower end of the T, but below the by-passing position of the valve plug 40, as shown in FIGURE 3. At its outer side the purging port 60 is provided with interior threads and normally is closed by an iron pipe plug 61 having a noncircular wrench-receiving socket. In a meter installation the meter bar 10 normally is connected as shown in FIGURE 1, i.e. a meter 12 is connected to the lower ends of the two T's 22 and 24, a service line 14 is connected to the lateral inlet 34 of the inlet T 22, house piping 18 is connected to the lateral outlet of the outlet T 24 and, the upper ends of the T's are closed by the plugs 40 and caps 50.

In order to utilize the by-passing meter bar 10 to by-pass the supply of gas to the dwelling around the meter 12 so as to permit the latter to be detached from the bar and replaced by another meter, there is provided a separate by-passing assembly 62 illustrated in FIGURE 3. The by-passing assembly 62 includes a short conduit section 64 of flexible material, such as hose, or the like, having an elbow fitting 66 inserted in each end thereof and secured thereto as by means of an exterior clamping strap 68. The free ends of the fittings face in the same direction and since the two fittings 66 are identical, a description of one will suffice for both.

The free end of each elbow fitting 66 rotatably carries a coupling nut 70 having, at one end thereof, a split ring 72 fitted into an interior groove and engaged with a shoulder 74 on the fitting. The other end of the nut 70 is provided with interior threads 76 adapted to engage with the exterior threads 52 on the upper end of one or the other of the T's 22 and 24 on removal of the cap 50. When the coupling nut 70 is so connected, it will be noted that the O-ring 54 in the end of the T will seal against the opposed end of the fitting 66, as shown in FIGURE 5.

Figure 6:
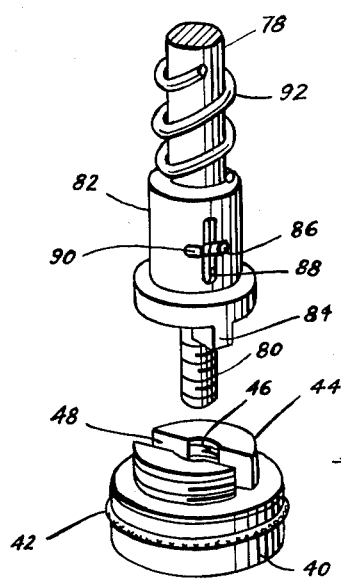
FIGURE 6 is an enlarged fragmentary perspective view illustrating the manner in which a valve stem carried by the by-passing assembly can be detachably connected to a valve plug in the meter bar.

Coaxially extending within the free end of each fitting 66 is a valve operating stem 78. At its lower end the stem 78 is porvided with exterior threads 80 engageable with the threads in the socket 46 in the upper end of a valve plug 40. Slidable on the stem 78 is a tubular driver 82 having, at its lower end, a pair of diametrically aligned projections 84 (best shown in FIGURE 6) adapted to fit into the kerf 48 in a valve plug 40. The driver 82 is retained on the stem 78 and restrained against rotation relative thereto, by a pin 86 extending transversely through the stem and into longitudinal slots 88 in the opposite sides of the driver. Below its upper end each longitudinal slot 88 is transversely intersected by a short circumferential slot 90 so that the ends of the pin 86 can be engaged in the latter to hold the driver 82 in an upper or retracted position on the stem, as shown in FIGURE 6. The driver 82 is continually urged downwardly on the stem 78 by a compression spring 92 engaged between the upper end of the driver and a downwardly facing shoulder 94 on the stem.

Above the shoulder 94 the stem has a smooth cylindrical section of uniform diameter extending snugly through a complementary bore 96 formed in the wall of the fitting 66, such bore being surrounded by an exterior boss 98. The stem 78 preferably is sealed to the fitting 66, as by an O-ring 100 disposed in a circumferential groove in the wall of the bore 96 and snugly embracing the stem. At its upper end the stem 78 is provided with a knurled operating handle 102. A transverse bore 104 is provided in the boss 98 for the reception of a detent plunger 106 constantly urged against the side of the stem 78 by a compression spring 108 engaged between a shoulder in the bore 104 and a shoulder on the plunger. The outer end of the detent plunger 106 is provided with a knurled retracting knob 110, while the inner end of the plunger is adapted to fit within one of two circumferential grooves 112 and 114 in the stem 78 below the handle 102. The plunger 106 will engage in the lower groove 114 when the stem 78 is manipulated to push a valve plug 40 to an intermediate position, as shown in FIGURE 5, and in the upper groove 112 when the plug is in a by-passing position as indicated in dotted lines in FIGURE 5.

In order to change a meter 12, the caps 50 are removed from the meter bar 10 and the valve stems 78 are pushed downwardly until the plungers 106 engage in the upper groove 112 so that the drivers 82 project beyond the lower ends of the coupling nuts 70. In this position, the drivers 82 are pushed upwardly by hand to their retracted position and rotated to engage the pins 86 in the transverse slots 90 to hold the drivers in such retracted position. The assembly 62 is then positioned so that the stems 78 align with the valve plugs 40 and the stems are then threaded into the sockets 46 in the upper ends of the plugs. The drivers 82 are then released by hand and allowed to move downwardly under the action of the springs 92, and then the stems 78 are rotated, as necessary, in order to allow the drivers to engage with the kerfs 48 in the valve plugs 40. The fittings 66 then are pushed downwardly along the stems 78 into a position wherein the coupling nuts 70 can be engaged and tightened on the threads 52 on the T's 22 and 24.

Each stem 78 then is rotated in a direction to unscrew the corresponding valve plug 40 from its engagement with the threads 38 in the T. The valve plug 40 in the inlet T 22 then is moved downwardly by its valve stem 78 to its intermediate position, as shown in FIGURE 5, and in such position the detent plunger 106 will automatically engage the groove 114 on the valve stem 78 to lock the latter in such position. The valve plug 40 in the outlet T 24 similarly is moved to its intermediate position. In this position of the plugs 40, incoming gas from the line 14 will flow through both the meter 12 and the by-pass assembly 62, and in its passage through the latter will force the air initially in such assembly into the outlet T 24 where it will mix with the gas flowing through the meter before delivery into the house piping 18. The quantity of air so introduced into the house piping 18 will be very small, however, being in fact equal to only the small interior volume of the by-pass assembly 62. Hence, the introduction of such a small quantity of air into the house piping 18, along with the mixing thereof with gas prior to such introduction, will not raise any danger of possibly extinguishing any pilot lights in the dwelling.

After a sufficient length of time has elapsed to enable the above-described mixing of air trapped in the by-passing assembly 62, usually of the order of about a minute, the detent plungers 106 are retracted and the inlet and outlet valve plugs 40 are pushed downwardly by the stems 78 to their by-pass position, shown in the dotted lines in FIGURE 5. The plugs 40 will be locked in this position by the automatic engagement of the detent plungers 106 with the upper grooves 112 in the stems 78. In this position of the plugs 40, the flow of gas from the service line 14 to the house piping 18 will take place completely through the by-pass assembly 62 and all flow of gas through the meter 12 will be blocked. Hence, the meter 12 can be uncoupled and replaced with a new or reconditioned meter without interruption of service.

After the replacement meter has been coupled to the meter bar 10, the plug 61 is removed from the purging port 60 in the outlet T 24, and, after retracting its detent plunger 106, the valve plug 40 in the inlet T 22 is moved upwardly to its intermediate position. In this position of the inlet valve plug 40, some of the gas will flow into the meter 12 and force air trapped therein out through the purging port 60. In this connection, the purging port 60 is small enough to prevent any sudden pressure drop in the gas continuing to flow through the by-pass assembly 62 and into the house piping 18. A sudden pressure drop might possibly extinguish a pilot light. The cubic content of the meter 12 is known, so that an operator merely by watching the meter dial can determine when such cubic content of air trapped therein has been forced out of the meter by incoming gas. At that time, the closure plug 61 for the purging port 60 is replaced. The valve plug 40 in the outlet T 24 then is moved up to its intermediate position and left in such position for a short period of time, such as one minute, in order to enable any small quantity of residual air which still may be present in the meter 12 to be forced out of the meter and into the house piping 18 by incoming gas. Since any such residual quantity of air will be very small, it will have no detrimental effect on any pilot lights.

Thereafter, both the valve plugs 40 are moved up to their meter position and screwed into the threads 38 in the upper ends of the T's 22 and 24 by appropriate manipulation of the stems 78. The coupling nuts 70 are then unscrewed and the fittings 66 pushed upwardly along the valve stems 78 so that the drivers 82 will be exposed and can be disengaged from the plug kerfs 48 and retained in their upper positions so that the stems 78 can be unscrewed from the plugs 40. The by-pass assembly 62 is then removed and the caps 50, wire 56, and seals 58 replaced on the meter bar 10.

It thus will be seen that the objects of this invention have been fully and effectively accomplished. It will be realized, however, that the foregoing specific embodiment has been illustrated and described only for the purpose of disclosing the principles of this invention and is subject to extensive change without departure from such principles. Accordingly, this invention includes all variations and modifications encompassed within the spirit and scope of the following claims.

I claim:

1. In a by-pass arrangement for a fluid meter, the combination comprising: a pair of inlet and outlet T means, each having a through bore and a lateral opening communicating with said bore intermediate the ends thereof; means on said T means for detachably connecting thereto a fluid meter in communication with corresponding ends of said bores; means on said T means for detachably connecting thereto by-pass conduit means in communication with the other ends of said bores; means on said tee means for detachably connecting thereto inlet and outlet conduits in communication with the lateral openings of said inlet and outlet T means, respectively; valve plug means reciprocable in said bore of each of said T means and movable between three positions, a meter position wherein flow is blocked between said lateral opening and said other end of said bore, a by-pass position wherein flow is blocked between said lateral opening and said meter end of said bore, and an intermediate position wherein flow can take place between said lateral opening and both ends of said bore; and interengageable thread means on each said valve plug means and in the said other end of each said bores for removably retaining each said valve plug means in said meter position.

2. The structure defined in claim 1 in which that end of each valve plug means facing the other end of the corresponding bore is provided with a coaxial thread and a non-circular configuration for connecting said plug means to the end of an operating stem carried by the by-pass conduit means.

3. In a by-pass arrangement for a fluid meter, the combination comprising: a pair of inlet and outlet T means, each having a through bore and a lateral opening communicating with said bore intermediate the ends thereof; means on said T means for detachably connecting thereto a fluid meter in communication with corresponding ends of said bores; means on said T means for detachably connecting thereto by-pass conduit means in communication with the other ends of said bores; means on said T means for detachably connecting thereto inlet and outlet conduits in communication with the lateral openings of said inlet and outlet T means, respectively; valve plug means reciprocable in said bore of each of said T means and movable between three positions, a meter position wherein flow is blocked between said lateral opening and said other end of said bore, a by-pass position wherein flow is blocked between said lateral opening and said meter end of said bore, and an intermediate position wherein flow can take place between said lateral opening and both ends of said bore; and rigid bar means integrally connecting said T means to form a meter bar.

4. In a by-pass arrangement for a fluid meter, the combination comprising: a pair of inlet and outlet T means, each having a through bore and a lateral opening communicating with said bore intermediate the ends thereof; means on said T means for detachably connecting thereto a fluid meter in communication with corresponding ends of said bores; means on said T means for detachably connecting thereto by-pass conduit means in communication with the other ends of said bores; means on said T means for detachably connecting thereto inlet and outlet conduits in communication with the lateral openings of said inlet and outlet T means, respectively; valve plug means reciprocable in said bore of each of said T means and movable between three positions, a meter position wherein flow is blocked between said lateral opening and said other end of said bore, a by-pass position wherein flow is blocked between said lateral opening and said meter end of said bore, and an intermediate position wherein flow can take place between said lateral opening and both ends of said bore; and means associated with said outlet T means for venting to atmosphere the meter end of its bore.

5. In a by-pass arrangement for a fluid meter, the combination comprising: a pair of inlet and outlet T means, each having a through bore and a lateral opening communicating with said bore intermediate the ends thereof; means on said T means for detachably connecting thereto a fluid meter in communication with corresponding ends of said bores; means on said T means for detachably connecting thereto by-pass conduit means in communication with the other ends of said bores; means on said T means for detachably connecting thereto and outlet conduits in communication with the lateral openings of said inlet and outlet T means, respectively; valve plug means reciprocable in said bore of each of said T means and movable between three positions, a meter position wherein flow is blocked between said lateral opening and said other end of said bore, a by-pass position wherein flow is blocked between said lateral opening and said meter end of said bore, and an intermediate position wherein flow can take place between said lateral opening and both ends of said bore; by-pass conduit means detachably connectable to said T means in communication with said other ends of said bores; manually-manipulable stem means sealingly and movably extending through a wall of said by-pass conduit means adjacent each end thereof; and means on the inner end of each of said stem means and the corresponding end of each of said plug means for detachably effecting a connection therebetween so that each said valve plug means can be moved between its said three positions by its corresponding stem means when said by-pass means is connected to said T means.

6. The structure defined in claim 5 including interengageable thread means on each valve plug means and in the other end of the corresponding bore for removably retaining each said valve plug means in its meter position, and wherein the connecting means on the inner end of each stem means effects a connection which will rotate said valve plug means on rotation of said stem means.

7. The structure defined in claim 5 including detent means associated with the by-pass conduit means and each stem means for releasably retaining the latter in positions corresponding to intermediate and to by-passing positions of the valve plug means when said stem means are connected thereto and said by-pass conduit means is connected to said T means.

8. The structure defined in claim 5 in which the connection-effecting means includes interengageable coaxial threads and interengageable non-circular configurations, and non-circular configuration on the stem means being formed on an axially-adjustable part of a multipart stem means.

9. In a by-pass arrangement for a fluid meter, the combination comprising: a pair of inlet and outlet T means, each having a through bore and a lateral opening communicating with said bore intermediate the ends thereof; means on said T means for detachably connecting thereto a fluid meter in communication with corresponding ends of said bores; means on said T means for detachably connecting thereto by-pass conduit means in communication with the other ends of said bores; means on said T means for detachably connecting thereto inlet and outlet conduits in communication with the lateral opening of said inlet and outlet T means, respectively; valve plug means reciprocable in said bore of each of said T means and movable between three positions, a meter position wherein flow is blocked between said lateral opening and said other end of said bore, a by-pass position wherein flow is blocked between said lateral opening and said meter end of said bore, and an intermediate position wherein flow can take place between said lateral opening and both ends of said bore; by-pass conduit means detachably connectable to said T means in communication with said other ends of said bores; manually-manipulable stem means sealingly and movably extending through a wall of said by-pass conduit means adjacent each end thereof for engaging and reciprocating the corresponding valve plug means; a cap detachably securable to each of said T means to cover said other end of said bore thereof; and annular gasket means carried by each said T means adjacent said other bore end thereof for alternative sealing engagement with the inner face of the corresponding cap or with a corresponding end of said by-pass conduit means.

10. By-pass conduit means for use with a fluid meter by-pass arrangement which includes a pair of inlet and outlet T means each having a through bore and a lateral opening, inlet and outlet conduits connected to the respective T means in communication with lateral openings thereof, a fluid meter detachably connected to the respective T means in communication with corresponding ends of the bore, a valve plug means reciprocable in the bore of each T means and movable between three positions, a meter position wherein flow is blocked between the lateral opening and the other end of the bore, a by-pass position wherein flow is blocked between the lateral opening and the meter end of the bore, and an intermediate position wherein flow can take place between the lateral opening and both ends of the bore, and interengageable threads on each valve plug means and in the other end of the corresponding bore for removably retaining each valve plug means in its meter position, said by-pass conduit means comprising: conduit means; means carried by the opposite ends of said conduit means for detachably connecting the same to the inlet and outlet T means in communication with the other ends of the bore thereof; and valve stem means movably and sealably projecting through a wall of said conduit means at each end of the latter, the inner end of said stem means being provided with a coaxial thread and a non-circular configuration for detachable engagement with complementary parts of the corresponding valve plug means.

11. The structure defined in claim 10 including detent means carried by the conduit means at each end thereof and detachably engageable with the corresponding valve stem means for retaining the same in positions corresponding to intermediate and by-passing positions of the respective valve plug means when engaged therewith.

12. The structure defined in claim 10 in which the non-circular configuration is formed on an axially adjustable part of a multipart stem means.

13. In a by-pass arrangement for a fluid meter, the combination comprising: a pair of inlet and outlet T means, each having a through bore and a lateral opening communicating with said bore intermediate the ends thereof; means on said T means for detachably connecting thereto a fluid meter in communication with corresponding ends of said bores; means on said T means for detachably connecting thereto by-pass conduit means in communication with the other ends of said bores; means on said T means for detachably connecting thereto inlet and outlet conduits in communication with the lateral openings of said inlet and outlet T means, respectively; valve plug means reciprocable in said bore of each of said T means and movable between three positions, a meter position wherein flow is blocked between said lateral opening and said other end of said bore, a by-pass position wherein flow is blocked between said lateral opening and said meter end of said bore, and an intermediate position wherein flow can take place between said lateral opening and both ends of said bore; interengageable means on each said valve plug means and in said other end of the corresponding bore for removably retaining each said valve plug means in said meter position; and a coaxial thread on that end of each valve plug means facing outwardly of the other end of the corresponding bore for connecting said plug means to the end of an operating stem carried by a by-pass conduit means.

14. The structure defined in claim 5 including interengageable means on each valve plug means and in the other end of the corresponding bore for removably retaining each said valve plug means in its meter position.

15. The structure defined in claim 5 including means associated with the by-pass conduit means and each stem means for indicating the positions of the latter corresponding to the intermediate and the by-passing positions of the corresponding valve plug means when said stem means is connected thereto and said by-pass conduit means is connected to said T means.

16. In a by-pass arrangement for a fluid meter, the combination comprising: a pair of inlet and outlet T means, each having a through bore and a lateral opening communicating with said bore intermediate the ends thereof; means on said T means for detachably connecting thereto a fluid meter in communication with corresponding ends of said bores; means on said T means for detachably connecting thereto by-pass conduit means in communication with the other ends of said bores; means on said T means for detachably connecting thereto inlet and outlet conduits in communication with the lateral openings of said inlet and outlet T means, respectively; valve plug means reciprocable in said bore of each of said T means and movable between three positions, a meter position wherein flow is blocked between said lateral opening and said other end of said bore, a by-pass position wherein flow is blocked between said lateral opening and said meter end of said bore, and an intermediate position wherein flow can take place between said lateral opening and both ends of said bore; and a shoulder in the other end of each of said bores facing the meter end thereof, the minimum diameter of said shoulder being less than the maximum diameter of the corresponding plug and being engageable by the latter to prevent removal of the corresponding plug through said other end of said bore.

17. By-pass conduit means for use with a fluid meter by-pass arrangement which includes a pair of inlet and outlet T means each having a through bore and a lateral opening, inlet and outlet conduits connected to the respective T means in communication with the lateral openings thereof, a fluid meter detachably connected to the respective T means in communication with corresponding ends of the bore, a valve plug means reciprocable in the bore of each T means and movable between three positions, a meter position wherein flow is blocked between the lateral opening and the other end of the bore, a by-pass position wherein flow is blocked between the lateral opening and the meter end of the bore, and an intermediate position wherein flow can take place between the lateral opening and both ends of the bore, an interengageable means on each valve plug means and in the other end of the corresponding bore for removably retaining each valve plug means in its meter position, said by-pass conduit means comprising: conduit means; means carried by the opposite ends of said conduit means for detachably connecting the same to the inlet and outlet T means in communication with the other ends of the bores thereof; and valve stem means movably and sealably projecting through a wall of said conduit means at each end of the latter, the inner end of said stem means being provided with means for detachably connecting the same with complementary parts of the corresponding valve plug means.

18. The structure defined in claim 17 including means on the conduit means and on each stem means for indicating positions of the latter corresponding to the intermediate and by-passing positions of the corresponding valve plug means when said stem means is connected to the latter and the conduit means is connected to the inlet and outlet T means.

References Cited by the Examiner
UNITED STATES PATENTS
3,173,295   3/1965   Magleby _____ 73—201

RICHARD C. QUEISSER, *Primary Examiner.*

E. GILHOOLY, *Assistant Examiner.*